May 6, 1941.  E. KOMENDA  2,240,933

BODY WALL LINING COVERING AND CONNECTING DEVICE

Filed Jan. 12, 1939

Inventor:
ERWIN KOMENDA
Attorneys

Patented May 6, 1941

2,240,933

UNITED STATES PATENT OFFICE 2,240,933

BODY WALL LINING COVERING AND CONNECTING DEVICE

Erwin Komenda, Stuttgart-Korntal, Germany, assignor to Dr. Ing. h. c. F. Porsche, K.-G., Stuttgart-Zuffenhausen, Germany, a company of Germany Application January 12, 1939, Serial No. 250,591 In Germany January 15, 1938

5 Claims. (Cl. 296—29)

This invention relates to an improvement in a body wall lining covering and connecting device, more particularly as applied to the lining of the body walls of a motor vehicle.

An object of this invention is the provision of a simple and inexpensive device for covering the edges of a body wall lining.

Another object of this invention is the provision of a simple and inexpensive device, serving to cover the edges of a body wall lining, and at the same time to interconnect two or more body walls.

A further object of this invention is the provision of a soft elastic moulding for covering the edges of the lining of the body wall of a motor car, and interconnecting the longitudinal and transverse walls of the car.

Further objects and advantages of this invention will be apparent from a study of the description thereof hereinafter set forth taken in connection with the attached drawing wherein.

Figure 1:
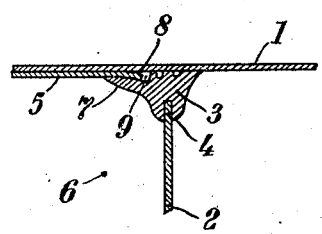
Fig. 1 is a transverse cross-sectional view of an arrangement in accordance with this invention, showing the relationship of the body wall lining and interconnecting device.

The walls of the motor vehicle such as the longitudinal and transverse walls are respectively indicated at 1 and 2 in Fig. 1. While these walls are illustrated as at approximately right angles to one another, this is unimportant since they may, in accordance with the principles of this invention immediately hereinafter described, form any angle with one another. The walls 1 and 2, however, are positioned at a slight distance from each other, as illustrated, and between them is inserted a moulding 3 of any suitable form of elastic material, as for example rubber. The wall 2 is preferably inserted in a groove 4 formed in the moulding 3.

The lining 5 of the body wall 1 facing the interior of the vehicle 6 projects under the extension of the moulding 3 so that its edge 8 will be entirely covered by the moulding. Preferably the moulding 3 is formed with a slightly hollow or curved portion 9 to receive the edge of the lining.

The moulding 3 being formed of soft elastic material such as rubber is made of such size that it will be squeezed between the walls 1 and 2. The moulding 3 will thus serve to firmly interconnect these walls. The moulding will likewise press down against the edge 8 of the lining 5 and firmly hold it in place. The main body of the lining 5 is, as usual, pasted against the body wall 1.

Figure 2:
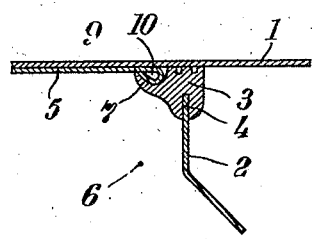
Fig. 2 is a transverse cross-sectional view similar to Fig. 1 illustrating a modified form of arrangement.

The form of construction illustrated in Fig. 2 is very similar to that shown in Fig. 1. Here however, the edge of the lining is formed in a bow or a loop 10 which will rest within the cut out portion 9 of the moulding 3. This arrangement will serve to hold the edge of the lining in place a bit more firmly than the construction illustrated in Fig. 1.

Figure 3:
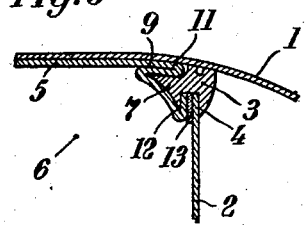
Fig. 3 is a transverse cross-sectional view similar to Figs. 1 and 2 showing a still further modified arrangement formed in accordance with this invention.

In Fig. 3 the lining 5 extends not only along the body wall 1 but covers the interior surface of the moulding 3. This is brought about by looping the lining under the cut out portion 9 of the moulding 3, as in the loop 11. Coming from this loop the lining then continues along the moulding 3 with its edge 12 inserted in the groove 4 holding the transverse wall 2. A binding member 13 may also be inserted in this groove so that the edge of the lining will be tightly held in place. If desired, the lining may be pasted along the moulding member and its edge 12 may be additionally held in the groove 4 by the pasting.

It will be seen that my improved arrangement for covering the edges of the lining of vehicle body walls and for interconnecting such vehicle body walls does away with the type of moulding heretofore used in which the moulding was held in place by a plurality of screws or rivets and thus involves considerable constructional expense. My arrangement also does away with the laborious operation now necessary in many constructions in which the edge of the wall lining is pushed into small cracks or openings so that it will be covered. The smooth and simple connection in accordance with my invention also improves the appearance of the interior of the vehicle.

While this invention has been particularly described in connection with the body walls of a motor vehicle it is to be understood as applicable to the walls of any vehicle such, for example, as aeroplanes or passenger cars of a train. Furthermore, while reference has been made to longitudinal and transverse walls, it is to be understood that these terms have been used merely for the purpose of description. As a matter of fact, the two surfaces to be interconnected could be any two surfaces whether in a vehicle or not. The true scope of this invention lies in its applicability to any surfaces one of which has lining the edges of which it is desired to cover.

The particular formation of the moulding itself is of no importance while the moulding may be made of any soft elastic material.

Accordingly, I do not intend that the scope of this invention be limited in any manner as except as required by the claims which follow.

I claim:

1. In a vehicle, in combination, a first body wall, a second body wall having an edge spaced from and extending towards said first body wall at an angle thereto, an interior lining mounted on said first body wall and extending towards said second body wall, and a moulding of elastic material squeezed between and interconnecting the edge of said second body wall and said first body wall, said moulding having a projecting portion extending over a part of said lining.

2. In a vehicle, a first body wall, a second body wall having an edge spaced from and extending towards said first body wall at an angle thereto, an interior lining mounted on said first body wall and having a portion folded back upon itself positioned near said second body wall, and a moulding squeezed between and interconnecting the edge of said second body wall and said first body wall, said moulding having a projecting portion extending over and covering the folded portion of said lining.

3. In a vehicle, a first body wall, a second body wall having an edge spaced from and extending towards said first body wall at an angle thereto, an interior lining mounted on said first body wall having an edge folded back in a loop positioned near said second body wall, and a moulding squeezed between and interconnecting the edge of said second body wall and said first body wall, said moulding having a hollow projecting portion extending over and covering said loop.

4. The combination according to claim 1, in which said moulding is formed with a groove to receive said second body wall.

5. In a vehicle, a first body wall, a second body wall extending toward said first body wall and positioned at an angle thereto, an interior lining mounted on said first body wall and having a portion folded back upon itself positioned near said second body wall, and a moulding intermediate and interconnecting said first and second body walls, said moulding having a projecting portion extending over and covering the folded portion of said lining and being formed with a groove for the reception of said second body wall, said lining continuing about said moulding from said folded portion and having an edge thereof inserted in said groove.

ERWIN KOMENDA.